US012097788B2

(12) United States Patent
Osa et al.

(10) Patent No.: US 12,097,788 B2
(45) Date of Patent: Sep. 24, 2024

(54) VEHICLE SEAT AND VEHICLE SEAT FRAME

(71) Applicants: NHK SPRING CO., LTD., Yokohama (JP); SUBARU CORPORATION, Tokyo (JP); TOYOTA BOSHOKU KABUSHIKI KAISHA, Kariya (JP)

(72) Inventors: Syunichirou Osa, Yokohama (JP); Hiroki Matsuda, Yokohama (JP); Jun Shirai, Yokohama (JP); Masafumi Takano, Tokyo (JP); Fumito Kitanaka, Tokyo (JP); Kenji Nagumo, Tokyo (JP); Suguru Ishikawa, Tokyo (JP); Naoki Hayashi, Fujisawa (JP)

(73) Assignees: NHK Spring Co., Ltd, Yokohama (JP); Subaru Corporation, Tokyo (JP); Toyota Boshoku Kabushiki Kaisha, Kariya (JP)

( * ) Notice: Subject to any disclaimer, the term of this patent is extended or adjusted under 35 U.S.C. 154(b) by 99 days.

(21) Appl. No.: 18/069,614

(22) Filed: Dec. 21, 2022

(65) Prior Publication Data

US 2023/0202361 A1 Jun. 29, 2023

(30) Foreign Application Priority Data

Dec. 27, 2021 (JP) ................................ 2021-213135

(51) Int. Cl.
*B60N 2/42* (2006.01)
*B60N 2/427* (2006.01)

(52) U.S. Cl.
CPC ....... *B60N 2/42718* (2013.01); *B60N 2/4221* (2013.01)

(58) Field of Classification Search
CPC .......................... B60N 2/42718; B60N 2/4221
See application file for complete search history.

(56) References Cited

U.S. PATENT DOCUMENTS 4,636,002 A * 1/1987 Genjiro .................... B60N 2/22
297/319
5,022,707 A * 6/1991 Beauvais ............. B60N 2/4221
296/68.1

(Continued)

FOREIGN PATENT DOCUMENTS

| JP | 2003-104107 A | 4/2003 |
| JP | 5921307 B2 | 5/2016 |
| JP | 2019-127187 A | 8/2019 |

*Primary Examiner* — Philip F Gabler
(74) *Attorney, Agent, or Firm* — Knobbe, Martens, Olson & Bear, LLP (57) ABSTRACT

A vehicle seat frame includes a seat cushion frame, left and right links, a connection member, left and right slide rails, and left and right risers. The seat cushion frame includes left and right side frames. The left and right links each have a one end portion connected to respective front portions of the left and right side frames. The connection member connects the left and right links together in the seat left-right direction. The left and right slide rails are disposed below the left and right side frames and are attached to a floor section of the vehicle. The left and right risers are respectively attached to the left and right slide rails, are connected to respective other end portions of the left and right links, and are configured to be impacted by the connection member under load from the occupant during a head-on collision of the vehicle.

5 Claims, 11 Drawing Sheets (56) References Cited

U.S. PATENT DOCUMENTS

| | | | | |
|---|---|---|---|---|
| 5,967,604 | A * | 10/1999 | Yoshida | B60N 2/42709 |
| | | | | 296/68.1 |
| 6,619,750 | B2 * | 9/2003 | Toyota | B60N 2/4263 |
| | | | | 248/429 |
| 8,240,758 | B2 * | 8/2012 | Combest | B60N 2/42718 |
| | | | | 297/216.19 |
| 9,027,993 | B2 * | 5/2015 | Munemura | B60N 2/1615 |
| | | | | 297/340 |
| 10,493,876 | B2 * | 12/2019 | Couasnon | B60N 2/42781 |
| 2013/0193725 | A1 * | 8/2013 | Morimoto | B60N 2/4221 |
| | | | | 297/216.1 |
| 2013/0193737 | A1 * | 8/2013 | Morimoto | B60N 2/68 |
| | | | | 297/452.18 |
| 2013/0278030 | A1 | 10/2013 | Munemura et al. | |

\* cited by examiner

VEHICLE SEAT AND VEHICLE SEAT FRAME

CROSS-REFERENCE TO RELATED APPLICATION

This application is based on and claims priority under 35 USC 119 from Japanese Patent Application No. 2021-213135 filed on Dec. 27, 2021, the disclosure of which is incorporated by reference herein.

BACKGROUND

Technical Field

The present disclosure relates to a vehicle seat and a frame thereof.

Related Art

In a vehicle seat described in Japanese Patent Application Laid-Open (JP-A) No. 2003-104107, left and right frame sides of a seat cushion frame are connected to left and right moving rails of a seat track through left and right frame support brackets. A strut pipe having a substantially inverted U shape is disposed between the left and right frame support brackets. Two end portions of the strut pipe are supported by front end portions of the moving rails, and strut tops of the strut pipe are fixed to a lower face of a front panel of the seat cushion frame. During a head-on collision, input from an occupant restrained by a seatbelt is transmitted from the front panel and the left and right frame sides to a floor of the vehicle through the strut pipe thereof and through a seat track, and the front side of the seat cushion is maintained in a normal state. Occurrence of a submarining phenomenon by the occupant can accordingly be proactively suppressed.

SUMMARY

In the above related art the front portion of the seat cushion frame is reinforced by the above strut pipe. As a result the front portion of the seat cushion frame is accordingly suppressed from deforming during a head-on collision, and shock from the front portion of the seat cushion frame imparted to the occupant is not readily absorbed. There is accordingly room for improvement from the perspective of raising a shock absorbing ability.

In consideration of the above circumstances, an object of the present disclosure is to obtain a vehicle seat frame and a vehicle seat capable of raising a shock absorbing ability while suppressing occurrence of a submarining phenomenon during a head-on collision.

A vehicle seat frame of a first aspect of the present disclosure includes a seat cushion frame that configures a framework of a seat cushion for an occupant of a vehicle to sit on and that includes left and right side frames disposed at left and right side portions of the seat cushion, left and right links each having a one end portion connected to respective front portions of the left and right side frames, a connection member connecting the left and right links together in a seat left-right direction, left and right slide rails disposed below the left and right side frames and attached to a floor section of the vehicle, and left and right risers that are respectively attached to the left and right slide rails and to which respective other end portions of the left and right kinks are connected, and that include left and right impact portions configured to be impacted by the connection member under a load from the occupant during a head-on collision of the vehicle.

In the first aspect, the seat cushion frame that configures the framework of the seat cushion includes the left and right side frames disposed at left and right side portions of the seat cushion. The one end portions of the left and right links are connected to the respective front portions of the left and right side frames. The left and right links are connected together in the seat left-right direction by the connection member. The left and right slide rails are disposed below the left and right side frames. The left and right slide rails are attached to the vehicle floor section. The left and right risers are attached to the left and right slide rails. The left and right risers are connected to the other end portions of the left and right links and are provided with the left and right impact portions.

The connection member impact the left and right impact portions under load from the occupant wearing the seatbelt during a head-on collision of the vehicle. Inward collapse of the seat cushion is thereby suppressed, and the reaction force from the front portion of the seat cushion imparted to the occupant is increased, enabling a submarining phenomenon to be suppressed from occurring. Moreover, due to not being a configuration in which the front portion of the seat cushion frame is reinforced with a strut pipe in the manner adopted in the related art described in the above "BACKGROUND" section, the front portion of the seat cushion frame can be deformed as the load from the occupant imparted to the front portion of the seat cushion frame increases. This accordingly enables the shock absorbing ability to be raised.

A vehicle seat frame of a second aspect of the present disclosure is the first aspect, wherein the seat cushion frame includes a cushion pan that connects upper end portions of the front portions of the left and right side frames together in the seat left-right direction, and a reinforcement member that includes left and right reinforcement portions respectively affixed to seat left-right direction sides of a rear end portion of the cushion pan so as to reinforce the sides to which the reinforcement portions are affixed.

In the second aspect, the upper end portions of the front portions of the left and right side frames of the seat cushion frame are connected together in the seat left-right direction by the cushion pan. The left and right reinforcement portions included in the reinforcement member are respectively affixed to seat left-right direction sides of the rear end portion of the cushion pan, and the sides to which the reinforcement portions are affixed are reinforced. This means that at an initial stage of a head-on collision, deformation of the cushion pan by load from the buttocks of the occupant imparted to the cushion pan is suppressed. The reaction force from the cushion pan imparted to the occupant at the initial stage of the head-on collision is accordingly increased, enabling the submarining phenomenon occurrence suppressing effect to be raised. Thereafter the cushion pan deforms from the seat left-right direction center, which is not reinforced by the left and right reinforcement portions. This accordingly enables the shock absorbing ability raising effect to be secured.

A vehicle seat frame of a third aspect of the present disclosure is the second aspect, wherein the reinforcement member includes a connection portion that connects the left and right reinforcement portions together in the seat left-right direction.

In the third aspect the left and right reinforcement portions of the reinforcement member are connected together in the seat left-right direction by the connection portion, and so the reinforcement member can be configured as a single component. As a result this facilitates a reduction in manufacturing cost compared to cases in which the reinforcement member is two components. Moreover, at an initial stage of a head-on collision, reaction force from the connection portion is imparted to the buttocks of the occupant, enabling the submarining phenomenon occurrence suppressing effect to be raised even more.

A vehicle seat frame of a fourth aspect of the present disclosure is the first aspect, wherein the seat cushion frame includes a cushion pan that connects upper end portions of the front portions of the left and right side frames together in the seat left-right direction, and left and right reinforcement patches that are affixed to seat left-right direction side surfaces of the front portions of the left and right side frames further toward the seat front side than the one end portions of the left and right links so as to reinforce the side surfaces to which the reinforcement patches are affixed.

In the fourth aspect upper end portions of the front portions of the left and right side frames of the seat cushion frame are connected together in the seat left-right direction by the cushion pan. Moreover, the left and right reinforcement patches are fixed to the seat left-right direction side surfaces of the front portions of the left and right side frames, further to the seat front side than the one end portions of the left and right links, and the side surfaces to which the reinforcement patches are affixed are reinforced. Thus when load from the occupant is imparted to the front portions of the left and right side frames through the cushion pan at an initial stage of a head-on collision, the left and right side frames are suppressed from deforming so as to collapse inward toward the seat left-right direction inside. As a result reaction force imparted to the occupant at the initial stage of a head-on collision is increased, enabling the submarining phenomenon occurrence suppressing effect to be raised even more.

A vehicle seat of a fifth aspect of the present disclosure includes a seat cushion for an occupant to sit on, a seatback configuring a backrest to support a back of the occupant, and a framework comprising the vehicle seat frame of the first aspect.

In the fifth aspect, the framework of the vehicle seat equipped with the seat cushion and the seatback is configured by the vehicle seat frame of the first aspect. Similar advantageous effect are according obtained to those of the first aspect.

As explained above, the vehicle seat frame and the vehicle seat according to the present disclosure enable the shock absorbing ability to be raised while suppressing a submarining phenomenon from occurring during a head-on collision.

BRIEF DESCRIPTION OF THE DRAWINGS

Exemplary embodiments of the present disclosure will be described in detail based on the following figures, wherein.

DETAILED DESCRIPTION

A vehicle seat 10 and a vehicle seat frame 30 according to an exemplary embodiment of the present disclosure will now be described, with reference to FIG. 1 to FIG. 10C. Note that some of the reference numerals are omitted in the drawings to make viewing the drawings clearer. Moreover as appropriate in the drawings, an arrow FR indicates a vehicle front direction, an arrow UP indicates a vehicle upward direction, an arrow LH indicates a vehicle left direction, and an arrow RH indicates a vehicle right direction. When front-rear, left-right, and up-down directions are used in the following explanation, unless particularly stated otherwise, these refer to front-rear in the vehicle front-rear direction, left-right in the vehicle left-right direction (vehicle width direction), and up-down in the vehicle up-down direction.

Figure 10A:
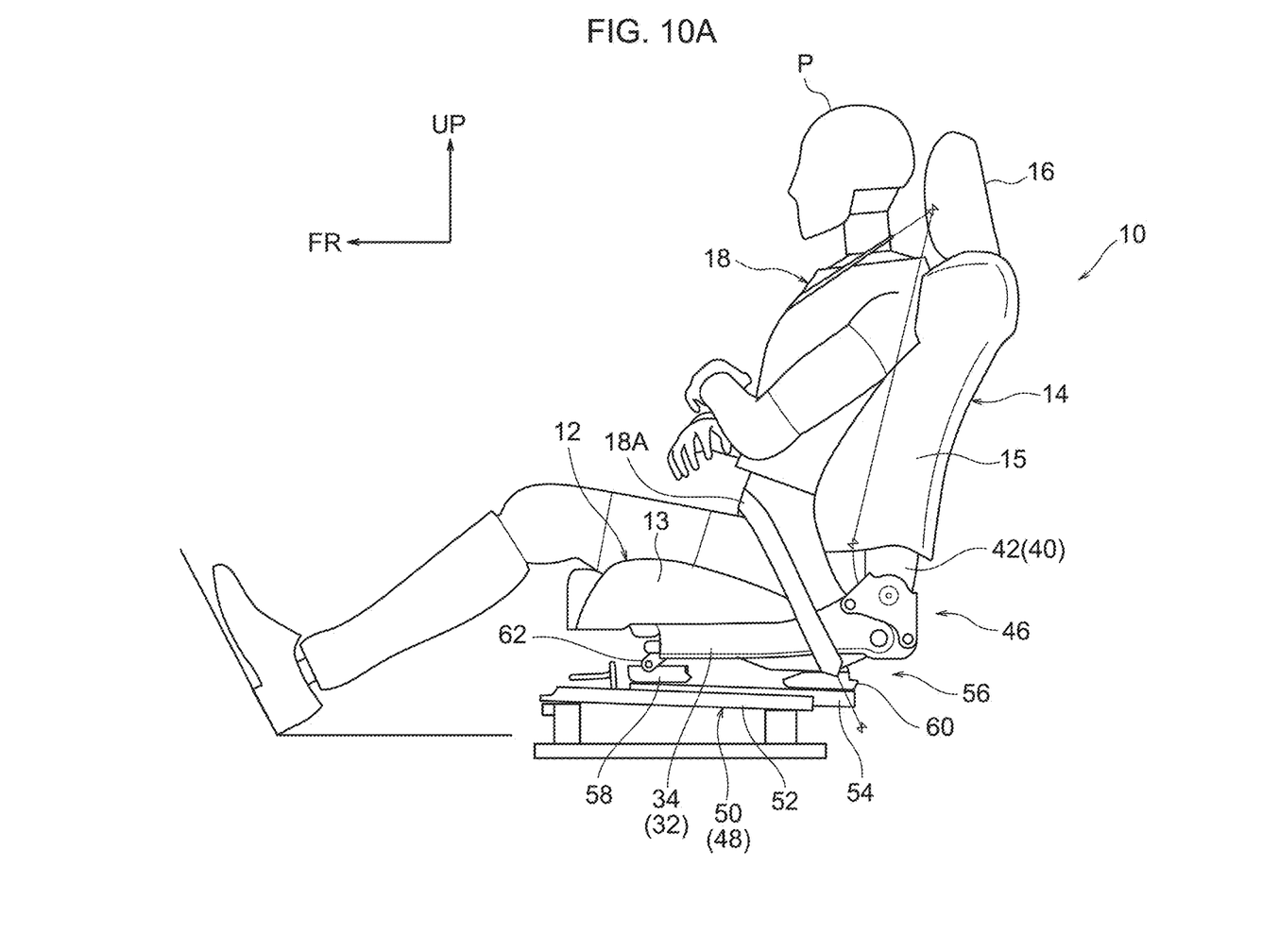
FIG. 10A is a side view illustrating a vehicle seat according to an exemplary embodiment, and is a side view illustrating a state prior to a head-on collision.
Figure 10B:
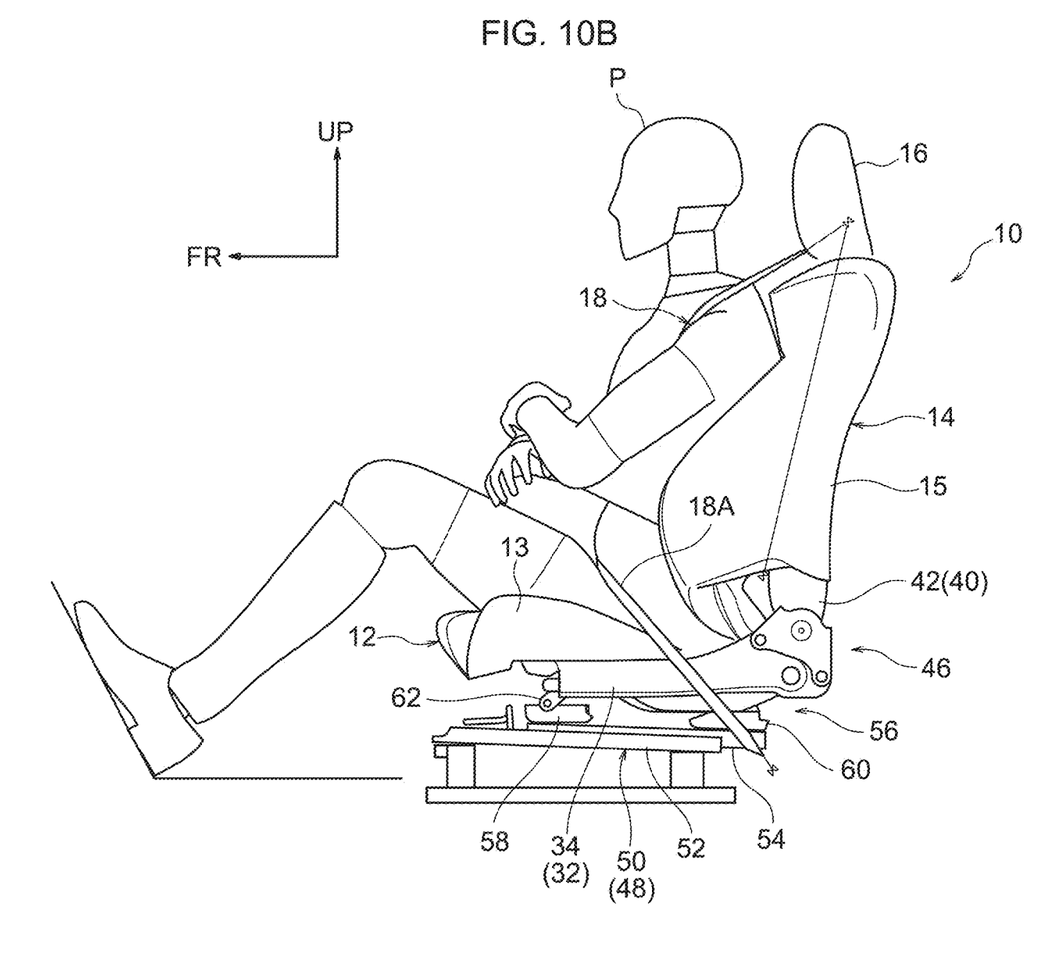
FIG. 10B is a side view corresponding to FIG. 10A and illustrating a state at an initial stage in a head-on collision.
Figure 10C:
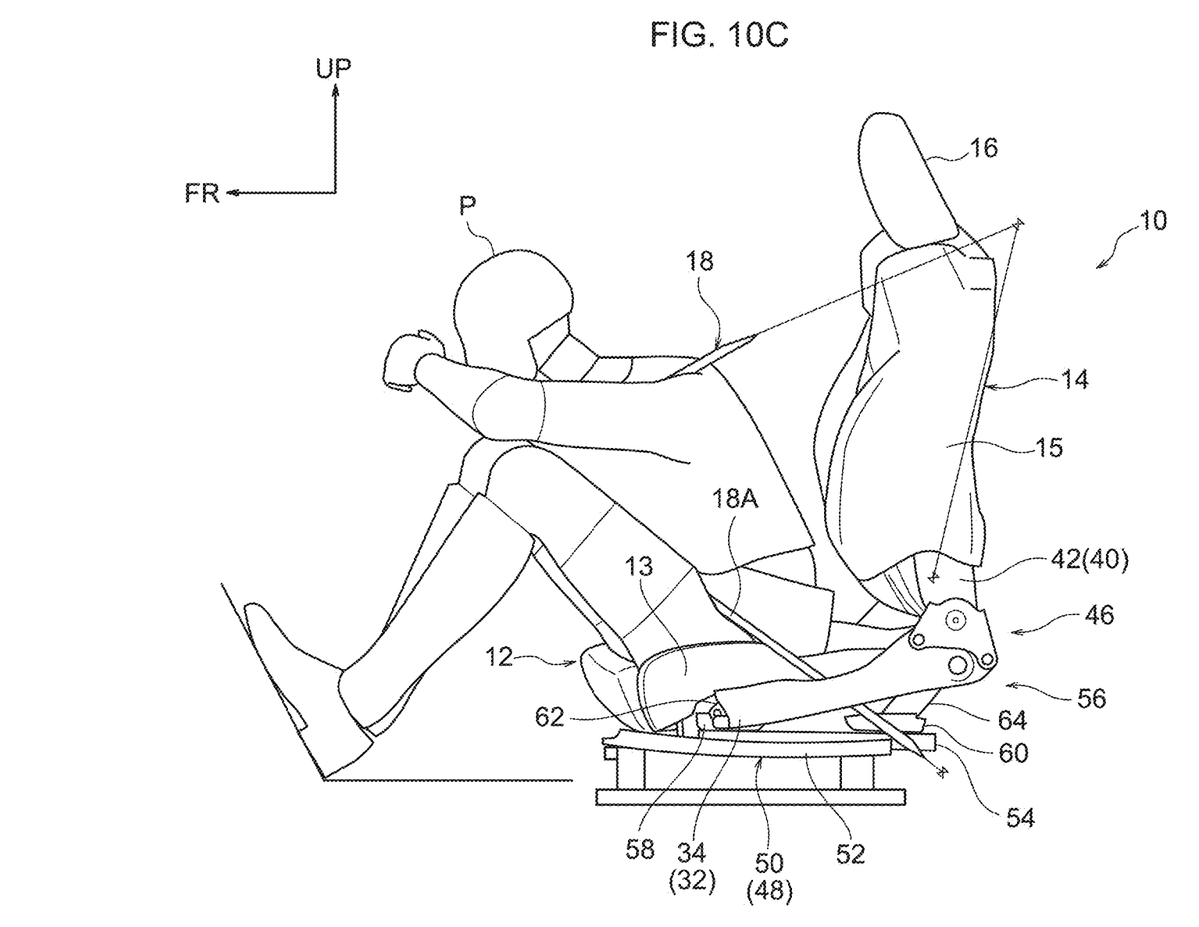
FIG. 10C is a side view corresponding to FIG. 10A and FIG. 10B and illustrating a state at later stage of a head-on collision.

As illustrated in FIG. 10A to FIG. 10C, the vehicle seat 10 according to the present exemplary embodiment includes a seat cushion 12 for an occupant P of a vehicle to sit on, a seatback 14 configuring a backrest to support the back of the occupant P, and a headrest 16 for supporting the head of the occupant P. The front-rear direction, left-right direction (width direction), and up-down direction of the vehicle seat 10 are respectively aligned with the front-rear, left-right, and up-down directions of the vehicle. Note that the occupant P illustrated in FIG. 10A to FIG. 10C is, for example, a fifty percentile America male adult (AM50) HYBRID III dummy for use in head-on collision crash tests. The occupant P wears a three-point seatbelt 18 installed to a non-illustrated vehicle.

Figure 1:
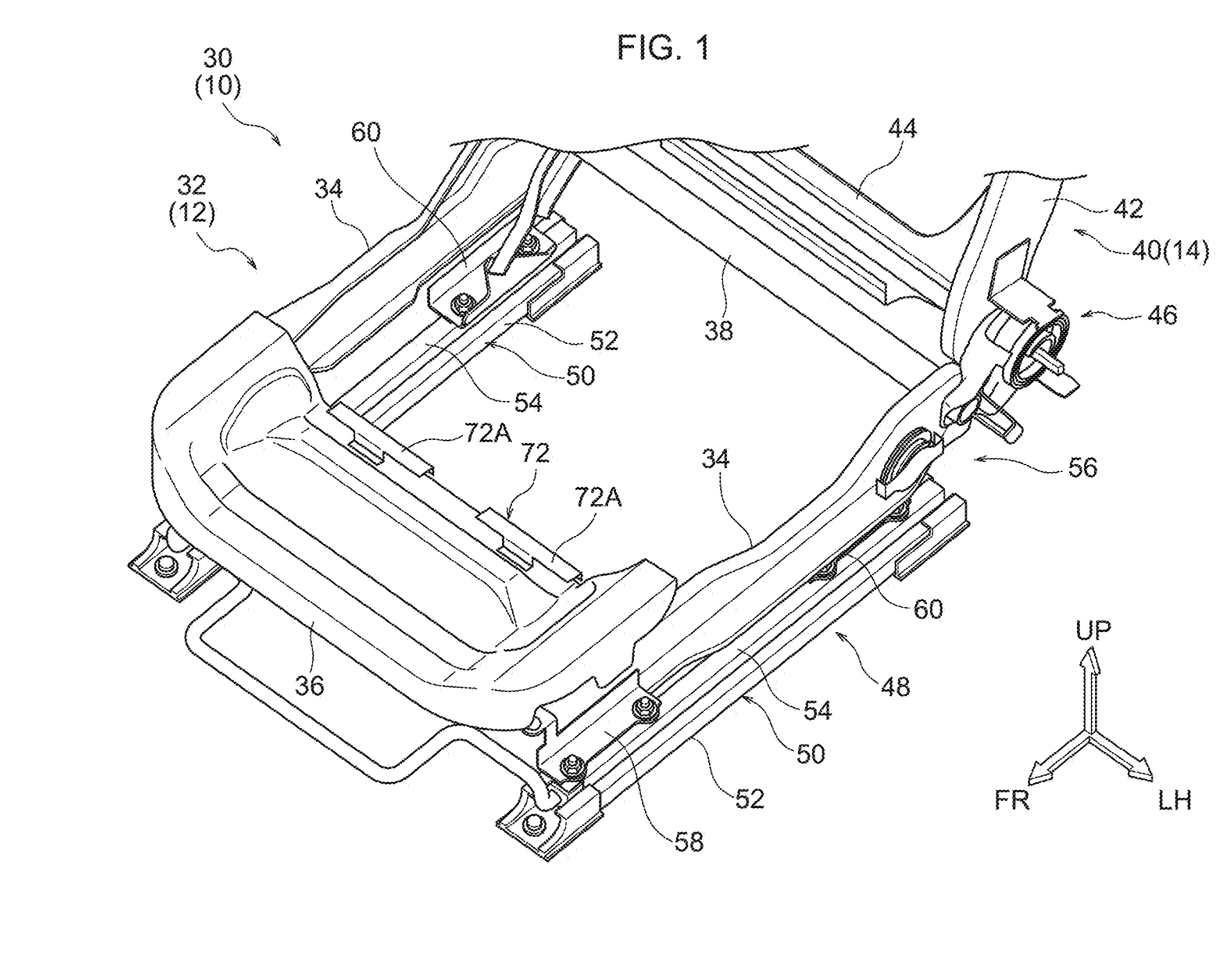
FIG. 1 is a perspective view illustrating a periphery of a seat cushion frame in a vehicle seat frame according to an exemplary embodiment, in a state viewed diagonal from a seat left-front side and above.
Figure 2:
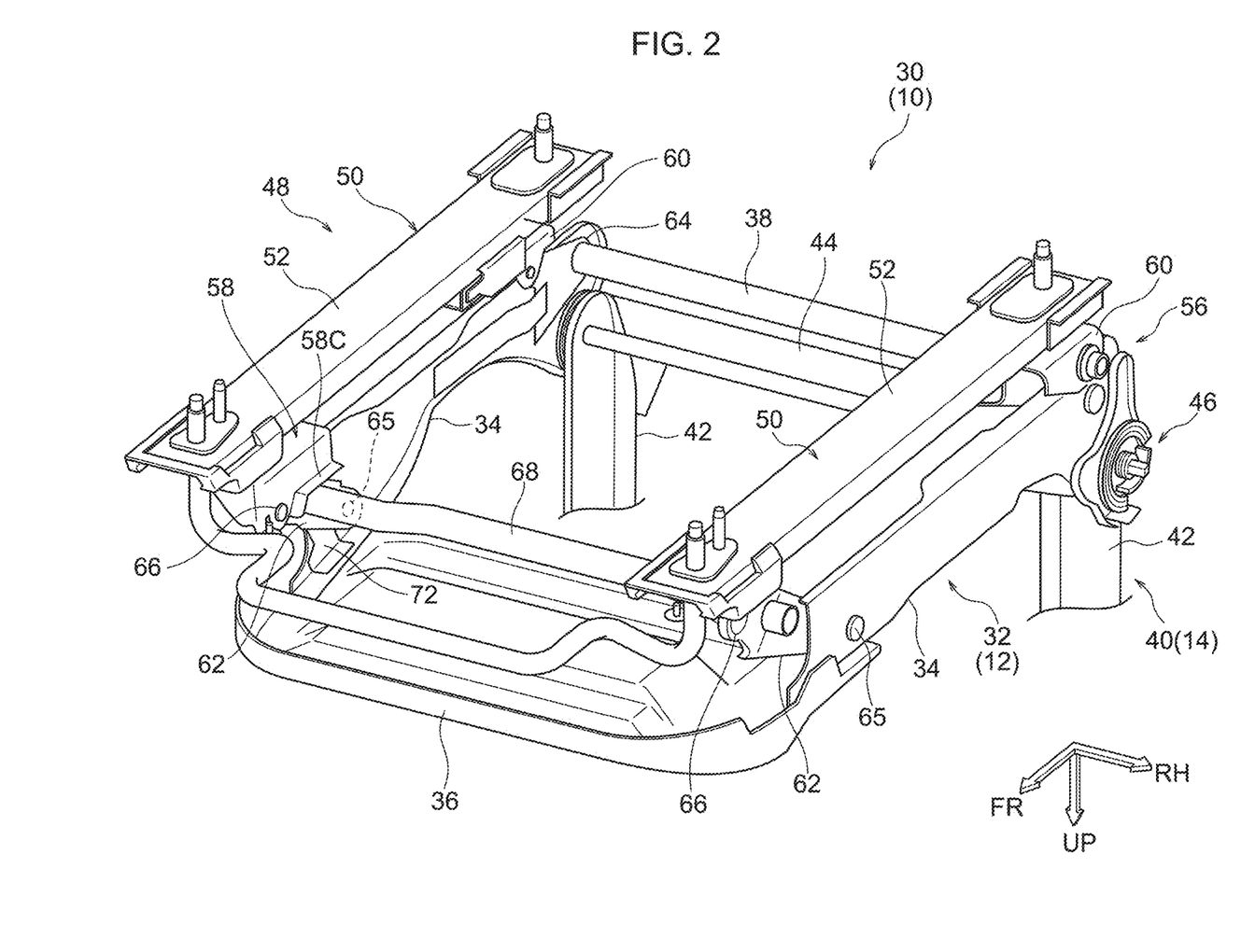
FIG. 2 is a perspective view illustrating a periphery of a seat cushion frame of the same vehicle seat frame, in a state viewed diagonal from a seat right-front side and below.
Figure 3:
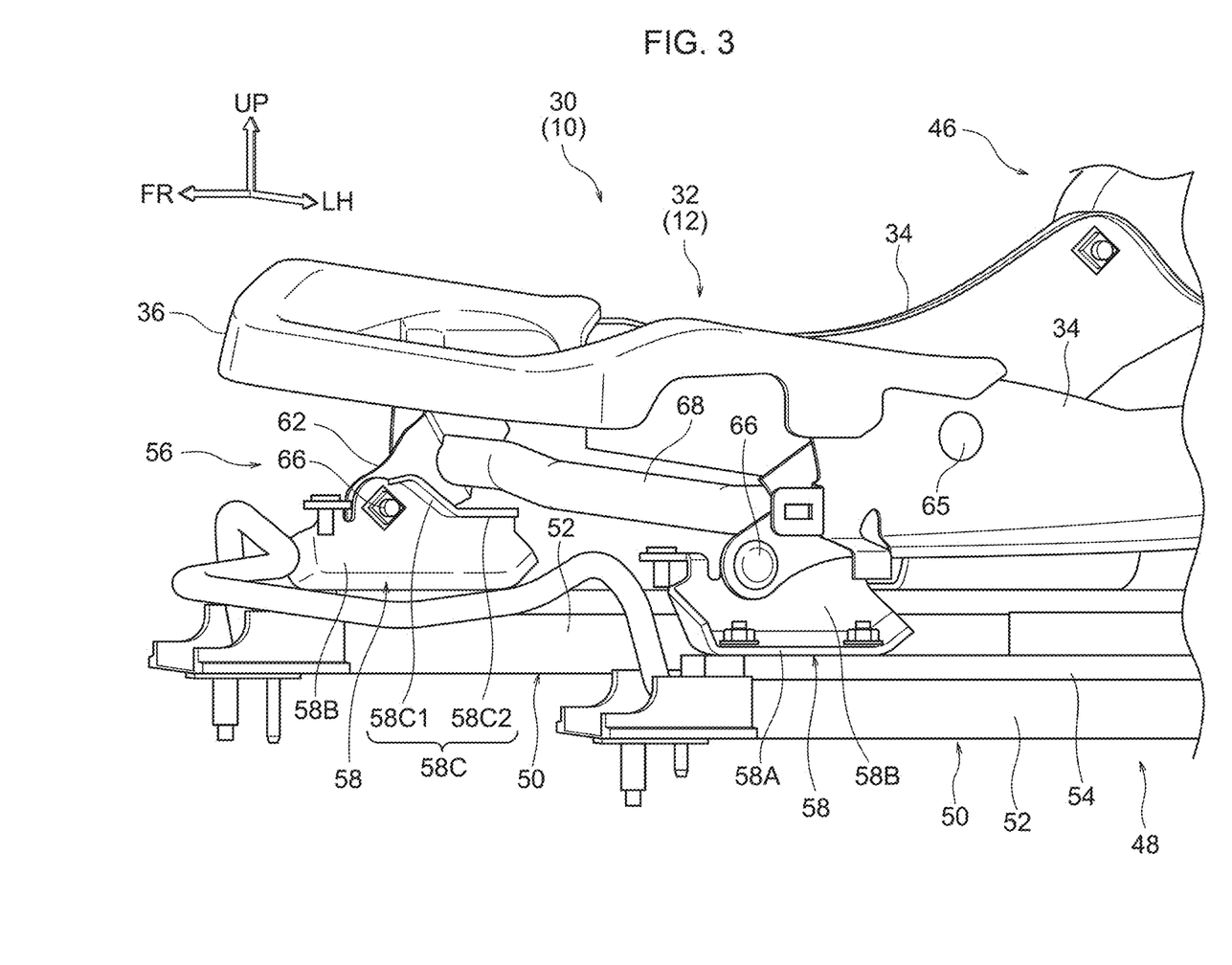
FIG. 3 is a perspective view illustrating a periphery of a front portion of a seat cushion frame of the same vehicle seat frame, in a state viewed diagonal from a seat left-front side.

The framework of the vehicle seat 10 is configured by a vehicle seat frame 30 as illustrated in FIG. 1 to FIG. 3. The vehicle seat frame 30 includes a seat cushion frame 32 configuring framework of the seat cushion 12, and a seatback frame 40 configuring framework of the seatback 14. Pad members (omitted in the drawings) respectively covered by a cover 13, 15 (see FIG. 10A to FIG. 10C) are attached to the seat cushion frame 32 and the seatback frame 40.

The seat cushion frame 32 includes a left-right pair of side frames 34 disposed at left and right side portions of the seat cushion 12 and extending along the seat front-rear direction, a cushion pan 36 spanning between upper end portions at the front portions of the left and right side frames 34, and a rear frame 38 spanning between rear end portions of the left and right side frames 34. Non-illustrated seat cushion springs are spanned between the cushion pan 36 and the rear frame 38. The pad member of the seat cushion 12 is elastically supported from the seat lower side by these seat cushion springs.

The left and right side frames 34 are, for example, formed in elongated shapes from press formed sheet metal, and are disposed at an orientation such that their length directions are along the seat front-rear direction, and their thickness directions are along the seat left-right direction. The cushion pan 36 is, for example, formed in a substantially rectangular shape from sheet metal, and is disposed at an orientation such that its thickness direction is along the seat up-down direction, and the seat left-right direction two end portions of the cushion pan 36 are fixed to the respective front portions of the left and right side frames 34 by a method such as welding. The rear frame 38 is, for example, formed from a metal pipe, and is disposed at an orientation such that its axial direction is along the seat left-right direction, with the seat left-right direction two end portions of the rear frame 38 connected, so as to allow rotation, to rear end portions of the left and right side frames 34 by a method such as crimping.

A lower end portion of the seatback frame 40 is connected to rear end portions of the left and right side frames 34 through a known reclining mechanism 46 so as to enable reclining. The seatback frame 40 includes a left-right pair of side frames 42 disposed at left and right side portions of the seatback 14 and extending in the seat up-down direction, a non-illustrated upper frame spanning between upper end portions of the left and right side frames 42, and a lower frame 44 spanning between lower end portions of the left and right side frames 42. The headrest 16 is connected to the above upper frame.

The left and right side frames 34 of the seat cushion frame 32 are connected to a vehicle floor section through a known slider mechanism 48 and lifter mechanism 56, and are accordingly adjustable in both front-rear direction position and up-down direction position with respect to the vehicle floor section. The slider mechanism 48 is configured including a left-right pair of slide rails 50 disposed below the left and right side frames 34. The slide rails 50 each include a lower rail 52 fixed to the vehicle floor section by, for example, a method such bolt fastening, an upper rail 54 supported by the lower rail 52 so as to be able to slide in the front-rear direction relative thereto, and a non-illustrated lock mechanism to restrict sliding of the upper rail 54 with respect to the lower rail 52. The lower rail 52 and the upper rail 54 are disposed with their long sides along the front-rear direction.

The lifter mechanism 56 is configured including a left-right pair of front risers 58 (see FIG. 1 to FIG. 3), a left-right pair of rear risers 60 (see FIG. 1 and FIG. 2), a left-right pair of front links 62 (see FIG. 2 to FIG. 3), and a left-right pair of rear links 64 (see FIG. 2; note that the right side rear link 64 is omitted in the drawing). The left and right front risers 58, the left and right rear risers 60, the left and right front links 62, and the left and right rear links 64 are, for example, manufactured from press formed sheet metal. The left and right front risers 58 correspond to "left and right risers" of the present disclosure, and the left and right front links 62 correspond to "left and right links" of the present disclosure.

As illustrated in FIG. 3, the left and right front risers 58 each include a front fixed portion 58A fixed to an upper face of front end portions of the left and right upper rails 54 by a method such as bolt fastening, a front vertical wall 58B extending upward from left-right direction inside end portions of the front fixed portion 58A, and an impact portion 58C extending toward the left-right direction inside from an upper end portion of the front vertical wall 58B. Although omitted from the drawings, the left and right rear risers 60 include rear fixed portions fixed to an upper face of rear end portions of the left and right upper rails 54 by a method such as bolt fastening and rear vertical walls extending upward from left-right direction one end portions of the rear fixed portions.

The left and right front links 62 and the left and right rear links 64 are disposed at orientations tilting toward the rear side. Each of one end portions (each upper end portion) of the left and right front links 62 is superimposed on a front portion of the left and right side frames 34 from the left-right direction inside, and is connected to the front portion of the left and right side frames 34 so as to be capable of rotating with respect thereto through a connection shaft 65 having an axial direction along the left-right direction. Each other end portion (each lower end portion) of the left and right front links 62 is superimposed on a front vertical wall 58B of the left and right front risers 58 from the left-right direction outside, and connected to the front vertical wall 58B so as to be capable of rotating with respect thereto through a connection shaft 66 having an axial direction along the left-right direction.

Each one end portion (each upper end portion) of the left and right rear links 64 is disposed at the left-right direction inside with respect to the rear portion of the left and right side frames 34, and is fixed to the rear frame 38. The left and right rear links 64 are accordingly connected to the left and right side frames 34 so as to be capable of rotating with respect thereto through the rear frame 38. Each other end portion (each lower end portion) of the left and right rear links 64 is superimposed on a rear vertical wall of the left and right rear risers 60 from one left-right direction side, and connected to the rear vertical wall so as to be capable of rotating with respect thereto through a connection shaft (omitted in the drawings) having an axial direction along the left-right direction.

A sector gear is, for example, formed to one of the left and right rear links 64, and this rear link 64 is rotated by a non-illustrated pinion meshed with this sector gear being rotated manually or electrically. A configuration is accordingly achieved in which the left and right rear links 64 and the left and right front links 62 are rotated thereby, and the up-down direction position of the seat cushion frame 32 (namely, the seat cushion 12) is changed.

The left and right front links 62 are connected together in the left-right direction by a connection pipe 68 serving as a connection member. The connection pipe 68 is configured from, for example, a metal pipe member, and is disposed with its axial direction along the left-right direction. The two axial direction end portions of the connection pipe 68 are inserted into through holes 70 (see FIG. 4) formed through intermediate portions of the left and right front links 62, and are fixed to the left and right front links 62 by a method such as welding.

Figure 4:
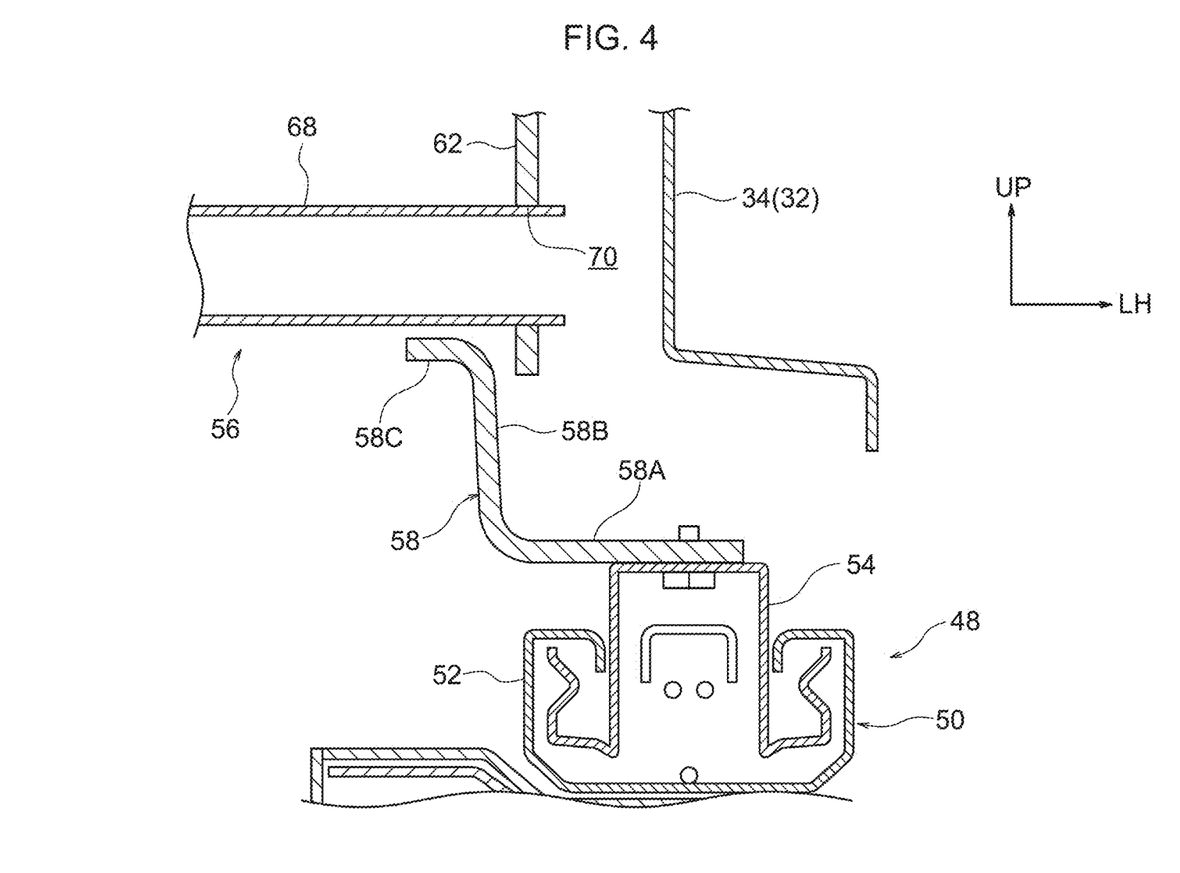
FIG. 4 is a cross-section illustrating a periphery of a riser, in a state viewed from a seat front side.
Figure 5:
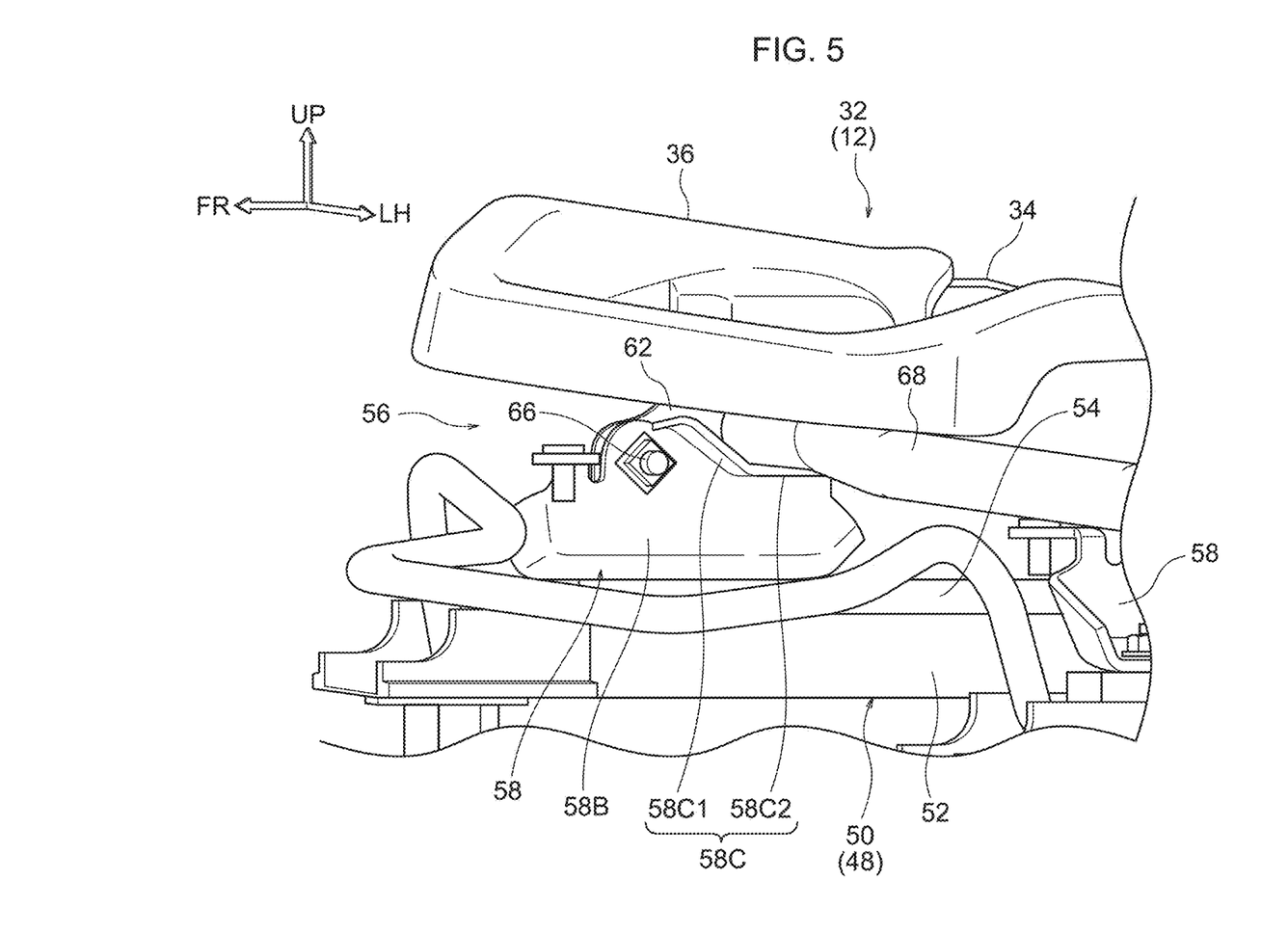
FIG. 5 is a perspective view corresponding to part of FIG. 3 and illustrating a state in which a connection pipe has impacted impact portions of risers.

As illustrated in FIG. 3 and FIG. 4, the two axial direction end portions of the connection pipe 68 are disposed slightly separated and diagonally to the seat upper-rear side with respect to the impact portions 58C of the left and right front risers 58. As illustrated in FIG. 3, locations at the front side of each of the impact portions 58C are configured by an inclined portion 58C1 inclined at a gradient descending toward the rear side, and locations at the rear side thereof are configured by a horizontal portion 58C2 extending horizontally. Configuration is made so as to secure a slight clearance between the connection pipe 68 and the impact portions 58C even when the connection pipe 68 is rotated together with the left and right front links 62.

However, during a vehicle head-on collision the connection pipe 68 impact the left and right impact portions 58C (see FIG. 5) due to an excessive load from the buttocks of the occupant P (see FIG. 10A to FIG. 10C) wearing the seatbelt 18 being imparted in a forward and diagonally downward direction to the seat cushion 12. This impact occurs when there is a slight deformation of the left and right front links 62 etc. due to the above load. The head-on collision referred to above is, for example, a collision similar to a full frontal rigid barrier impact test (at a speed of 35 mph (approximately 56 km/h)) as defined by the US National Highway Traffic Safety Administration (NHTSA). A comparatively low load from the occupant P is imparted to the seat cushion 12 at an initial stage of the head-on collision (see FIG. 10B), and a comparatively high load from the occupant P is imparted to the seat cushion 12 at a later stage of the head-on collision (see FIG. 10C). The clearance normally present between the connection pipe 68 and the impact portions 58C is set such that the connection pipe 68 impact the left and right impact portions 58C early in an initial stage of the head-on collision.

Moreover, in the present exemplary embodiment as illustrated in FIG. 1, the seat cushion frame 32 includes a reinforcement member 72 fixed to a rear end portion of the cushion pan 36. The reinforcement member 72 is, for example, manufactured from press formed sheet metal, and includes a left-right pair of reinforcement portions 72A and a connection portion 72B. The left and right reinforcement portions 72A are affixed to the two left-right direction sides of rear end portions of the cushion pan 36, and reinforce the affixed locations. The connection portion 72B connects the left and right reinforcement portions 72A together in the left-right direction.

Figure 6:
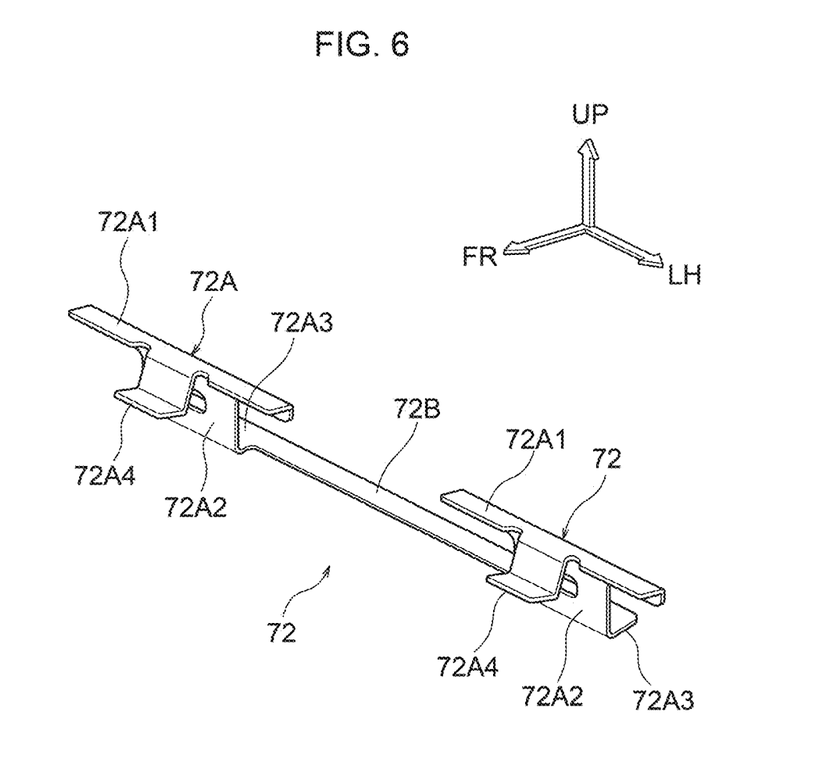
FIG. 6 is a perspective view illustrating a reinforcement member.

As illustrated in FIG. 6, the left and right reinforcement portions 72A each include, as an example, a fixed portion 72A1, a downward extension portion 72A2, a rearward extension portion 72A3, and a fixing tab 72A4. The fixed portions 72A1 are fixed to an upper face of rear end portions of the cushion pan 36 by a method such as welding. The downward extension portions 72A2 extend downward from left-right direction central portions of rear edges of the fixed portions 72A1. The rearward extension portions 72A3 extend rearward from lower ends of the downward extension portions 72A2. The rearward extension portions 72A3 of the left and right reinforcement portions 72A are connected together in the left-right direction by the connection portion 72B, and are formed as one body with the connection portion 72B. The fixing tabs 72A4 extend downward from left-right direction central portions of front edges of the fixed portions 72A1. A lower side of each of the fixing tabs 72A4 is bent forward. The fixing tabs 72A4 are inserted into non-illustrated holes formed in the cushion pan 36, and are fixed to the cushion pan 36 by a method such as welding.

Figure 7A:
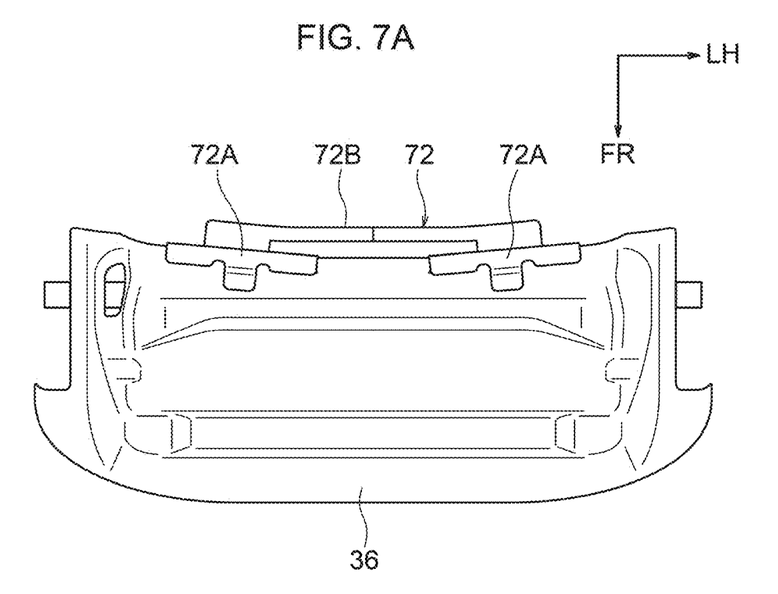
FIG. 7A is a plan view illustrating a cushion pan and a reinforcement member.
Figure 7B:
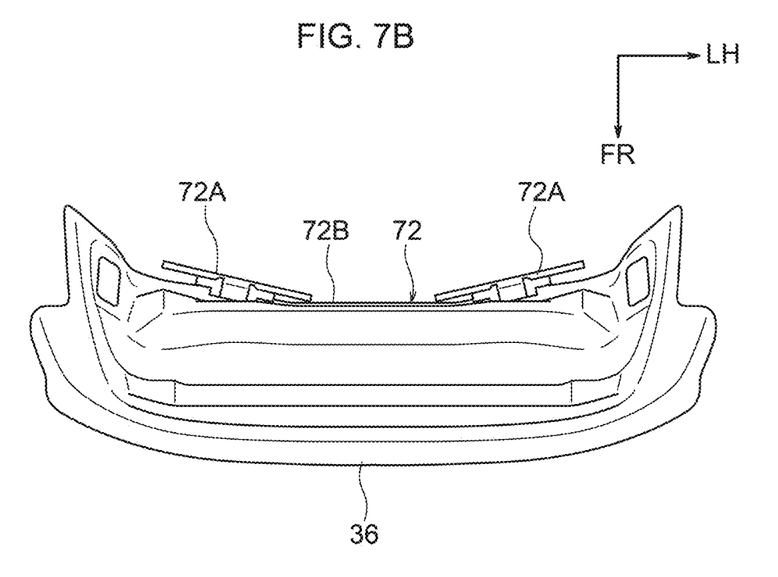
FIG. 7B is a plan view illustrating a cushion pan and a reinforcement member, in a state deformed by load from an occupant during a head-on collision.

The reinforcement member 72 configured as described above serves as a deformation amount adjustment member for adjusting the amount of deformation of the cushion pan 36 during a head-on collision. The left and right reinforcement portions 72A are disposed at positions so as to oppose the left and right ischial bones of the occupant P (omitted in the drawings) from the front side. Thus during a head-on collision the load from the left and right ischial bones of the occupant P is input to the locations affixed with the left and right reinforcement portions 72A on the cushion pan 36. As illustrated in FIG. 7A, at an initial stage of a head-on collision deformation (collapsing inward toward the lower side) of the cushion pan 36 is suppressed by the left and right reinforcement portions 72A. Then, at a later stage of the head-on collision, the cushion pan 36 is deformed as illustrated in FIG. 7B by an increase in the load imparted to the cushion pan 36 from the left and right ischial bones of the occupant P.

Figure 8:
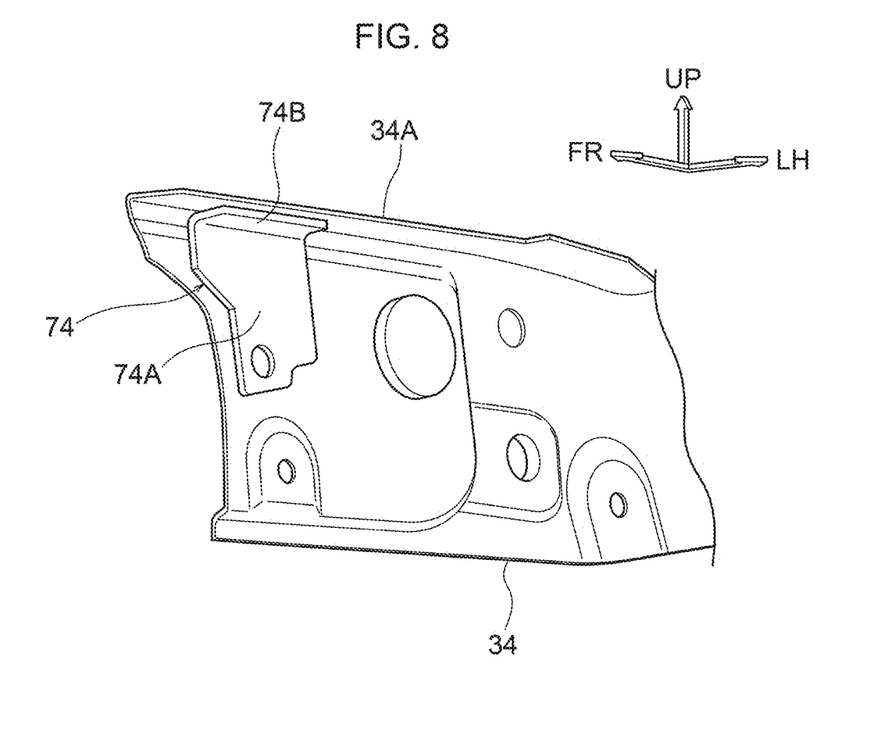
FIG. 8 is a perspective view illustrating a front portion of a side frame.

Furthermore, in the present exemplary embodiment, as illustrated in FIG. 8, the seat cushion frame 32 includes left and right reinforcement patches 74 fixed to left-right direction side surfaces (in this example inside surfaces) of the front portions of the left and right side frames 34. The left and right reinforcement patches 74 are disposed further toward the front side than the one end portions (the upper end portions) of the left and right front links 62 connected to the front portions of the left and right side frames 34.

The reinforcement patches 74 are, for example, manufactured from press formed sheet metal. Each of the reinforcement patches 74 includes, as an example, a patch main body 74A superimposed on the left-right direction inside face of the front portion of each of the side frames 34, and an upper flange 74B extending toward the left-right direction inside from an upper edge of the patch main body 74A. An upper flange 34A extending toward the left-right direction inside is formed to an upper edge of each of the side frames 34, and the upper flange 74B of each of the reinforcement patches 74 is superimposed on a lower face of the upper flange 34A. These reinforcement patches 74 are fixed to front portions of the side frames 34 by a method such as welding, and the front portions of the side frames 34 are reinforced at the locations affixed with the reinforcement patches 74. Note that a configuration may be adopted in which the reinforcement patches 74 are each fixed to a left-right direction outside face of the front portions of the side frames 34. The shape of each of the reinforcement patches 74 may also be modified as appropriate.

Figure 9:
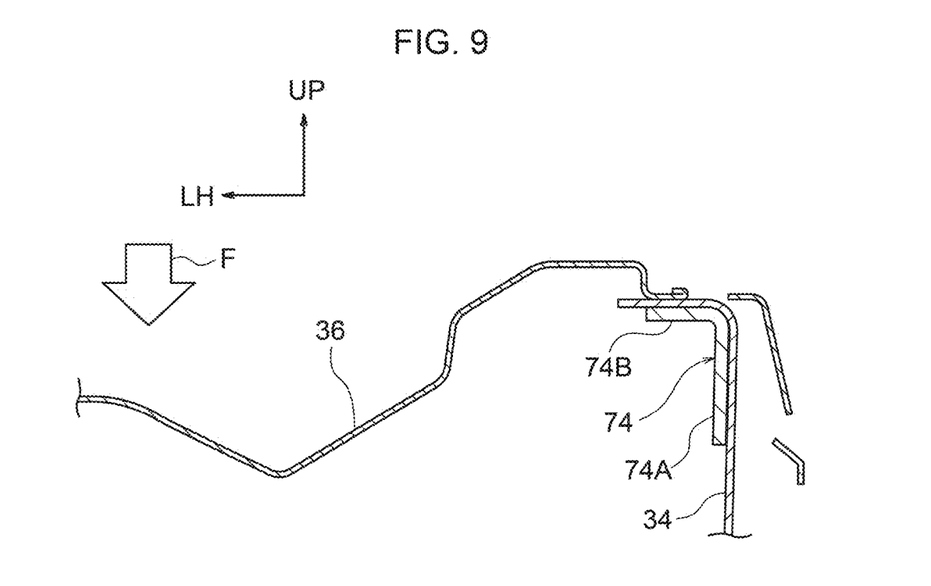
FIG. 9 is a cross-section illustrating a periphery of a reinforcement patch, in a state viewed from a seat rear side.

The left and right reinforcement patches 74 configured as described above serve as reinforcement members to suppress deformation of the front portions of the left and right side frames 34 toward the left-right direction inside (inward collapse) under load F from the occupant imparted to the cushion pan 36 during a head-on collision (see FIG. 9). Such deformation suppression results in a configuration in which a reaction force from the front portion of the seat cushion 12 imparted to the buttocks of the occupant P is increased at an initial stage of the head-on collision.

Operation and Advantageous Effects

Next, description follows regarding operation and advantageous effects of the present exemplary embodiment.

In the vehicle seat 10 as described above, the seat cushion frame 32 configuring the framework of the seat cushion 12 includes the left and right side frames 34 disposed at the left and right side portions of the seat cushion 12. The one end portion of each of the left and right front links 62 is connected to the respective front portion of the left and right side frames 34. The left and right front links 62 are connected together in the left-right direction by the connection pipe 68. The left and right slide rails 50 are disposed below the left and right side frames 34. The left and right slide rails 50 are attached to the vehicle floor section. The left and right front risers 58 are attached to the left and right slide rails 50. The other end portions of the left and right front links 62 are connected to the respective left and right front risers 58, and the left and right impact portions 58C are also provided thereto.

At an initial stage of a vehicle head-on collision (see FIG. 10B), the connection pipe 68 impact the left and right impact portions 58C under load from the occupant P wearing the seatbelt 18. Thus the seat cushion 12 is suppressed from collapsing inward at an initial stage of the head-on collision, and the reaction force from the front portion of the seat cushion 12 imparted to the occupant P is increased. Movement under inertia of the occupant P toward the vehicle front is suppressed as a result thereof, and restraint of the waist of the occupant P by a lap belt 18A of the seatbelt 18 is maintained so as to enable a submarining phenomenon to be effectively suppressed from occurring. Moreover, this configuration is not one in which the front portion of the seat cushion frame 32 is reinforced by a strut pipe in the manner adopted in the related art described in the above "BACKGROUND" section. This means that, as illustrated in FIG. 10C, the front portion of the seat cushion frame 32 can be caused to deform as the load from the occupant P imparted to the front portion of the seat cushion frame 32 increases at a later stage of the head-on collision. The shock absorbing ability can accordingly be raised thereby. As a result this enables a reduction to be achieved in the injury severity score of the occupant P.

Moreover, the present exemplary embodiment includes the reinforcement member 72 fixed to the rear end portion of cushion pan 36 of the seat cushion frame 32. The reinforcement member 72 includes the left and right reinforcement portions 72A fixed to two seat left-right direction sides of the rear end portion of the cushion pan 36, and the locations affixed with the left and right reinforcement portions 72A on the cushion pan 36 are reinforced thereby. Deformation of the cushion pan 36 by load imparted from the buttocks of the occupant P to the cushion pan 36 is accordingly suppressed at an initial stage of the head-on collision (see FIG. 10B). The reaction force from the cushion pan 36 imparted to the occupant P is accordingly increased at the initial stage of the head-on collision, raising the occupant P forward movement suppressing effect, and raising the submarining phenomenon occurrence suppressing effect. Moreover, the load imparted from the occupant P to the front portion of the seat cushion frame 32 increases at a later stage of the head-on collision (see FIG. 10C). The cushion pan 36 is accordingly deformed from the seat left-right direction center, which is not reinforced by the left and right reinforcement portions 72A. This enables the shock absorbing ability raising effect to be secured.

Moreover, in the present exemplary embodiment the left and right reinforcement portions 72A of the reinforcement member 72 are connected in the seat left-right direction by the connection portion 72B, enabling the reinforcement member 72 to be configured as a single component. As a result this a reduction in manufacturing cost is facilitated compared to cases in which the reinforcement member 72 is two components. Moreover, due to reaction force from the connection portion 72B also being imparted to the buttocks of the occupant P at an initial stage of the head-on collision, the submarining phenomenon occurrence suppressing effect can be raised even more.

Furthermore, in the present exemplary embodiment the left and right reinforcement patches 74 are fixed to the seat left-right direction side surfaces of the front portions of the left and right side frames 34 of the seat cushion frame 32 further toward the seat front side than the one end portions of the left and right front links 62, and the locations affixed with the reinforcement patches 74 are reinforced. This means that, at an initial stage of the head-on collision, the left and right side frames 34 are suppressed from deforming so as to collapse inward toward the seat left-right direction insides when load from the occupant P is imparted to the front portions of the left and right side frames 34 through the cushion pan 36. The reaction force imparted to the occupant P at the initial stage of the head-on collision is increased as a result, enabling the submarining phenomenon occurrence suppressing effect to be raised even more.

Note that although in the above exemplary embodiment the reinforcement member 72 fixed to the rear end portion of the cushion pan 36 is configured including the connection portion 72B connecting the left and right reinforcement portions 72A together, there is no limitation thereto, and the reinforcement member 72 may be configured without including the connection portion 72B.

Moreover, although in the above exemplary embodiment the seat cushion frame 32 is configured including the reinforcement member 72 and the left and right reinforcement patches 74, there is no limitation thereto, and a configuration may be adopted in which the seat cushion frame 32 lacks one out of the reinforcement member 72 or the reinforcement patches 74, or lacks both thereof.

Moreover, although in the above exemplary embodiment the connection pipe 68 serving as the connection member is configured manufacture from a metal pipe, there is no limitation thereto, and the material of the connection member may be modified as appropriate.

Various other modifications may also be implemented in the present disclosure within a range not departing from the spirit of the present disclosure. Obviously the scope of rights of the present disclosure is not limited by the above exemplary embodiments.

What is claimed is:

1. A vehicle seat frame comprising:
   a seat cushion frame that configures a framework of a seat cushion for an occupant of a vehicle to sit on, and that includes left and right side frames disposed at left and right side portions of the seat cushion;
   left and right links each having a one end portion connected to respective front portions of the left and right side frames;
   a connection member connecting the left and right links together in a seat left-right direction;
   left and right slide rails disposed below the left and right side frames and attached to a floor section of the vehicle; and
   left and right risers that are respectively attached to the left and right slide rails and to which respective other end portions of the left and right links are connected, and that include left and right impact portions configured to be impacted by the connection member under a load from the occupant during a head-on collision of the vehicle.

2. The vehicle seat frame of claim 1, wherein the seat cushion frame includes:
   a cushion pan that connects upper end portions of the front portions of the left and right side frames together in the seat left-right direction; and
   a reinforcement member that includes left and right reinforcement portions respectively affixed to seat left-right direction sides of a rear end portion of the cushion pan so as to reinforce the sides to which the reinforcement portions are affixed.

3. The vehicle seat frame of claim 2, wherein the reinforcement member includes a connection portion that connects the left and right reinforcement portions together in the seat left-right direction.

4. The vehicle seat frame of claim 1, wherein the seat cushion frame includes:
- a cushion pan that connects upper end portions of the front portions of the left and right side frames together in the seat left-right direction; and
- left and right reinforcement patches that are affixed to seat left-right direction side surfaces of the front portions of the left and right side frames, further toward the seat front side than the one end portions of the left and right links so as to reinforce the side surfaces to which the reinforcement patches are affixed.

5. A vehicle seat comprising:
- a seat cushion for an occupant to sit on;
- a seatback configuring a backrest to support a back of the occupant; and
- a framework comprising the vehicle seat frame of claim 1.

* * * * *